June 8, 1965 A. J. JORGENSEN 3,188,484

PULSE SYNCHRONIZER

Filed June 21, 1961

INVENTOR.
ARNOLD J. JORGENSEN
BY Christie, Parker & Hale
ATTORNEYS.

3,188,484
PULSE SYNCHRONIZER

Arnold J. Jorgensen, Duarte, Calif., assignor to Burroughs Corporation, Detroit, Mich., a corporation of Michigan Filed June 21, 1961, Ser. No. 118,664
9 Claims. (Cl. 307—88.5)

This invention relates to electronic circuits and more particularly to synchronizing circuits for use in digital computer systems.

Digital computer systems generally have a number of peripheral units for shifting digital signals into and out of a digital computer. The digital computer has a source of clock pulses for synchronizing its operation. The peripheral units are normally operated out of synchronism with the clock pulses. Also, the signals from the peripheral units often have a repetition rate very much lower than those of the clock pulses. This creates a problem in that the digital signals from the peripheral units must somehow be synchronized and then read by various circuits in the digital computer. Also, the digital signals must only be read by the digital computer once, otherwise the digital computer will have received erroneous information.

Previously, a pair of flip-flop circuits have been used for synchronizing the digital signals from peripheral units with the clock pulses of the digital computer. However, flip-flop circuits are generally expensive and require a considerable amount of space for mounting in the digital computer system.

In contrast, the present invention provides an inexpensive pulse synchronizing circuit and requires only a very small amount of space for mounting. The pulse synchronizing circuit provides a synchronized pulse during a single clock pulse and while the unsynchronized pulse is present.

Briefly, one embodiment of the present invention includes a bistable circuit with gating circuits connecting its input circuit both to the peripheral unit supplying the signals to be synchronized and to the source of clock pulses in the digital computer. An output circuit of the bistable circuit is serially connected through a time delay circuit to the input of a switching means. Whenever a clock pulse occurs in coincidence with an unsynchronized pulse, the bistable circuit is triggered from a first to a second state of operation. This initiates a synchronizing cycle. During the synchronizing cycle the bistable circuit provides a signal to the time delay circuit. The signal to the time delay circuit causes it to develop a signal at the input of the switching means. The signal to the input of the switching means causes it to develop a synchronizing pulse during the occurrence of the next clock pulse. When the unsynchronized pulse terminates, the bistable state circuit is reset to the initial state allowing a new synchronizing cycle to be initiated.

A better understanding of the present invention may be obtained with reference to the following description of the figures of which:

Figure 1:
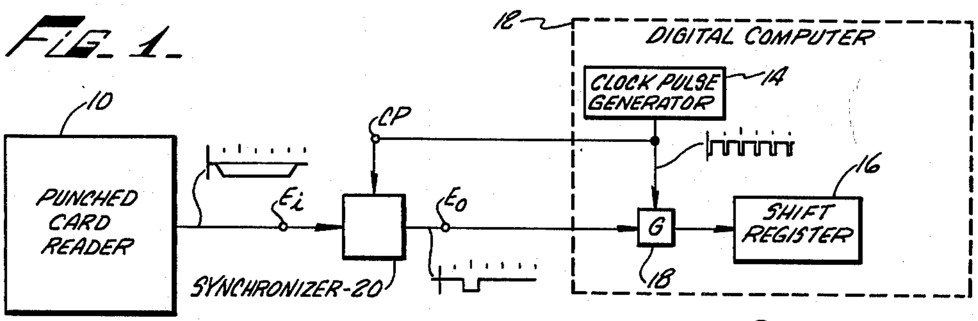
FIGURE 1 is a general block diagram of a computer system incorporating a pulse synchronizer circuit and embodying the present invention.

FIGURE 1 shows a punched card reader 10 for supplying pulses to a digital computer 12. The punched card reader 10 is for reading coded digital information stored on punched paper cards. In the following discussion, the signals from the peripheral units will be referred to as unsynchronized pulses. The unsynchronized pulses from the punched card reader 10 are negative pulses of potential coded to represent the signals stored on the punched cards.

The digital computer 12 has a source of clock pulses or timing pulses designated as the clock pulse generator 14. The clock pulse generator 14 has an output circuit designated CP at which the clock pulses are developed. The clock pulses are evenly spaced recurring negative pulses of potential. The repetition rate of the clock pulse signals is higher than that of the unsynchronized pulses. Therefore, a number of clock pulses occur during each unsynchronized pulse.

A shift register 16 is provided in the digital computer 12. The shift register 16 comprises a conventional flip-flop storage register and gating for storing input pulses. A gating circuit 18 is connected to the input circuit of the shift register 16 for controlling the application of input pulses thereto.

A pulse synchronizer circuit 20 is connected between the output circuit of the punched card reader 10 and an input circuit of the gating circuit 18. The CP output circuit of the clock pulse generator 14 is connected to input circuits of both the pulse synchronizer circuit 20 and the gating circuit 18.

Generally, the operation of the computer system of FIG. 1 is as follows: Whenever the punched card reader 10 develops an unsynchronized pulse, the following clock pulse triggers the pulse synchronizer circuit 20 a synchronizing cycle. During the synchronizing cycle, the pulse synchronizer circuit 20 develops a synchronized pulse. The synchronized pulse is a negative pulse of potential simlar to the clock pulses and lasts long enough for a single clock pulse to occur, namely the next clock pulse after that initiating the synchronizing cycle. The gating circuit 18 is responsive to the coincidence of the synchronized pulse and the simultaneously occurring clock pulse to provide an input pulse to the shift register 16.

It should also be understood that the synchronized pulse may be used by the digital computer to read a plurality of unsynchronized pulses in parallel. This could be accomplished by applying all unsynchronized pulses to the digital computer in parallel and simultaneously developing a synchronized pulse. The digital computer would then be arranged to read all unsynchronized pulses in parallel during the synchronized pulse.

Figure 2:
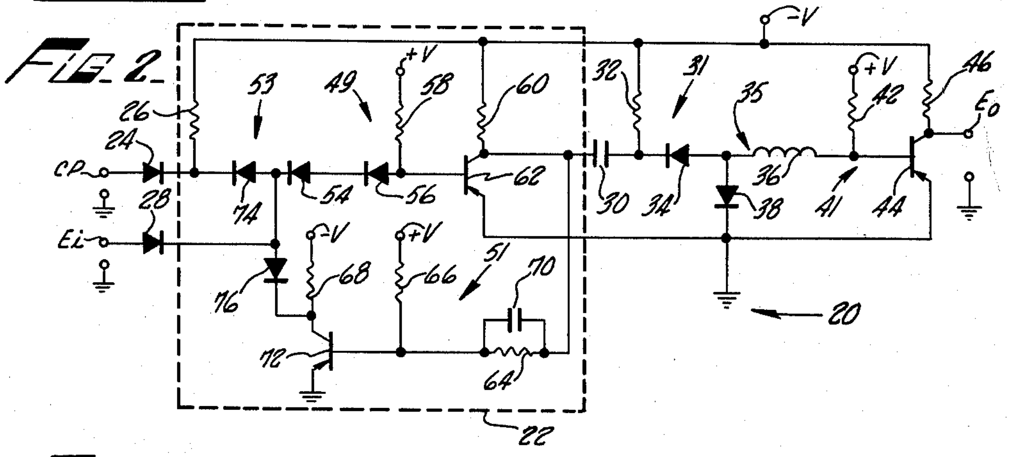
FIGURE 2 is a detailed schematic diagram of a pulse synchronizer circuit for use in the computer system of FIG. 1 and embodying the present invention.

With the general computer system of FIG. 1 in mind, refer now to the detailed schematic diagram thereof shown in FIG. 2. The pulse synchronizer 20 has a bistable state circuit 22. The CP output circuit of the clock pulse generator 14 is connected through the anode to cathode electrodes of a silicon isolation diode 24 to the input circuit of the bistable circuit 22. The isolation diode 24 may comprise a part of the clock pulse generator 14.

The output circuit of the punched card reader 10 is indicated by the symbol $E_1$ and is connected to the input circuit of the bistable circuit 22 through the anode to cathode electrodes of a silicon diode 28. It should be noted that the diode 28 may comprise a part of the punched card reader 10.

The output circuit of the bistable circuit 22 is connected to the input circuit of a time delay circuit 31. The time delay circuit 31 includes a capacitor 30, a resistor 32 and an isolation diode 34. The cathode electrode of the diode 34 is connected to one end of the resistor 32 and one side of the capacitor 30. The other ends of the capacitor 30 and the resistor 32 are connected to the output circuit of the bistable circuit 22 and the —V power supply, respectively. The output circuit of the time delay circuit 31 is at the anode electrode of the diode 34.

A second time delay circuit 35 is connected to the output circuit of the time delay circuit 31. The time delay circuit 35 includes a diode 38 and an inductive impedance element 36. The diode 38 has its cathode electrode connected to ground (zero volts potential), and its anode electrode connected both to one end of the inductive element 36 and the anode electrode of the diode 34. The output circuit of the time delay circuit 35 is at the opposite end of the inductive element 36 from the diode 38.

A switching means 41 is connected to the output circuit of the time delay circuit 35. The switching means 41 includes a resistor 42, a PNP transistor 44 and a resistor 46. The transistor 44 has its base electrode connected to the inductive element 36 and one end of the resistor 42. The other end of the resistor 42 from the transistor 44 is connected to a positive power supply (not shown) indicated by the symbol +V. The transistor 44 has its emitter electrode connected to ground and its collector electrode connected through the resistor 46 to the —V power supply. The pulse synchronizer 20 has an output circuit at the collector electrode of the transistor 44 and is designated as point $E_o$.

Refer now to the bistable circuit 22. Two switching means 49 and 51 are shown with the output circuit of the switching means 49 connected to the input circuit of the switching means 51. Also, the output circuit of the switching means 51 is connected through a gating circuit 53 back to the input circuit of the switching means 49.

The switching means 49 includes silicon diodes 54 and 56, resistors 58 and 60 and a PNP transistor 62. The input circuit to the switching means 49 is at the cathode electrode of the diode 54. The anode electrode of the diode 54 is serially connected through the cathode to anode electrodes of the diode 56 to the base electrode of the transistor 62. The junction of the diode 56 and the transistor 62 is connected through a resistor 58 to the +V power supply. The transistor 62 has its collector electrode connected through a resistor 60 to the —V power supply and its emitter electrode connected to ground. The collector electrode of the transistor 62 is also connected to the other plate of the capacitor 30 from the diode 34. The transistor 62 and resistors 58 and 60 form a transistor switching circuit.

The switching means 51 includes resistors 64, 66 and 68, a capacitor 70, and a PNP transistor 72. The resistor 64 and the capacitor 70 are connected in parallel circuit relation and the parallel circuit is connected between the collector electrode of the transistor 62 and the base electrode of the transistor 72. The base electrode of the transistor 72 is also connected through the resistor 66 to the +V power supply. The transistor 72 has its collector electrode serially connected through the resistor 68 to the —V power supply and its emitter electrode connected to ground. The transistor 72 and the resistors 66 and 68 form a transistor switching circuit for providing signals back to the input circuit of the switching means 49 through the gating circuit 53. The output circuit of the switching means 49 and the input circuit of the switching means 51 is at the junction of the resistor 64 and the transistor 62. The output circuit of the switching means 51 is at the collector electrode of the transistor 72.

The gating circuit 53 includes the diodes 74 and 76. A resistor 26 is connected between the cathode electrode of the diode 24 and the —V power supply. The resistor 26 helps establish the correct signal level at the cathode electrode of the diode 74 and may be considered as a part of the clock pulse generator 14. The gating circuit 53 has three input circuits. Two of the input circuits are at the cathodes of the diodes 74 and 76 and the third is at a junction formed by the connection of the anodes of the diodes 74 and 76. The cathode electrodes of the diodes 76 and 74 are connected to the collector electrode of the transistor 72 and the cathode electrode of the diode 24, respectively. The junction formed by the diodes 74 and 76 is connected to the cathodes of the diodes 28 and 54.

With the details of the schematic diagram shown in FIG. 2 in mind, its operation will be explained. In the following discussion reference should be made to the timing diagram of FIG. 2, which shows signals at designated points in the pulse synchronizer of FIG. 2. Assume the signals at the CP and $E_i$ input circuits are at zero volts potential and the pulse synchronizer 20 is in a static condition. The diode 24 is forward biased causing the signal at the cathode electrode of the diode 74 to be at zero volts (neglecting the forward drop across the diode 24). With the anode electrode of the diode 56 coupled to the +V power supply and the cathode electrode of the diode 74 at zero volts potential, the forward potential drop across the diodes 56, 54 and 74 is adjusted so that the potential at the base electrode of the transistor 62 is slightly positive. This maintains the transistor 62 in a non-conductive condition when the output signal at CP is around zero volts potential.

Since the transistor 62 is in a non-conductive state, the signal at the collector electrode of transistor 62 is at a low potential level, equal to that out of the —V power supply. This results in a negative potential at the base electrode of the transistor 72 causing it to be in a conductive condition. Since the transistor 72 is in a conductive condition, its collector electrode is at zero volts potential (neglecting the emitter to collector voltage drop).

Refer now to the switching means 41. The transistor 44 is in a conductive condition. This is due to current flowing from ground through the elements including emitter to base electrodes of the transistor 44, the inductive element 36, the diode 34 and the resistor 32 to the —V power supply. Thus, the output signal at $E_o$ is at zero volts potential (neglecting the emitter to collector voltage drops) or a high potential level. Since the collector electrode of the transistor 62 is at a potential equal to that from the —V power supply and the cathode electrode of the diode 34 is at zero volts potential (neglecting the voltage drops through the transistor 44, inductive element 36 and the diode 34), the voltage across the capacitor 30 is equal to the potential out of the —V power supply.

Assume now that a clock pulse occurs while the signal at the input circuit $E_i$ is at a high potential level. The anode of the diode 24 drops to a low potential level during the clock pulse. However, the high potential signal at the anode of the diode 28 clamps the potential at the cathode electrode of the diode 74 at the high potential level. This causes the diode 24 to reverse bias and the operation of the pulse synchronizer 20 remains in its static condition.

Assume now that the signal at the input circuit $E_i$ drops to a low potential level in between the occurrence of two clock pulses. The signal at the anode of the diode 28 drops to a low potential level. The high potential at the anode of the diode 54 clamps the potential at the cathode of the diode 28 at the high potential level and the diode 28 is reverse biased. Thus, the signal at the cathode of the diode 54 does not change and the pulse synchronizer again remains in a static state.

In summary, the pulse synchronizer circuit remains in its static condition if the input circuit $E_i$ drops to a low potential in the absence of a clock pulse. Also, the pulse synchronizer 20 will remain in its static condition during the occurrence of a clock pulse if the input circuit $E_i$ remains at a high potential level.

Assume now that the input circuit $E_i$ has dropped to a low potential level and in coincidence a clock pulse occurs. The signal at the anode and cathode electrodes of the diode 24 drop to a low potential level. The potential at the anode of the diode 28 no longer holds the cathode electrode of the diode 54 at a high potential level so it drops to a low potential level. This pulls the base electrode of the transistor 62 to a low potential level causing the transistor 62 to switch into a conductive condition. Thus, the pulse synchronizer is energized and switches out of the static state. When the transistor 62 switches into a conductive condition, the potential at its collector electrode rises to a high potential level. The change in potential at the collector of the transistor 62 is applied both to the capacitor 30 and to the capacitor 70.

Referring first to the capacitor 70, the rise in potential thereto is initially shorted through the capacitor 70 to the base electrode of the transistor 72. This immediately causes the transistor 72 to switch into a non-conductive condition. Before the transistor 72 was switched into a non-conductive condition, it was operating in a saturated conductive condition. This caused minority carrier storage in the base electrode of the transistor 72. The speed-up capacitor 70 causes these minority carriers to be immediately swept out of the transistor 72 for fast switching action. Fast switching is important since the transistor 72 must be in a non-conductive condition in order to maintain the transistor 62 in a conductive condition. With the transistor 72 in a non-conductive condition, its collector electrode is at a low potential level and holds the transistor 62 in a conductive condition.

The rise in potential at the collector electrode of the transistor 62 is also coupled through the capacitor 30 to the cathode of the diode 34. Since the anode of the diode 34 is biased at ground potential, the diode 34 is reverse biased. The capacitor 30 immediately starts to discharge through the series circuit path of the collector to emitter electrodes of the transistor 62, the capacitor 30 and the resistor 32. As the capacitor 30 discharges, the potential at the cathode of the diode 34 starts dropping back towards a low potential level.

Refer now to the time delay circuit 35. When the diode 34 was reverse biased, it stopped the current flow through the transistor 44, the inductive impedance element 36 to the —V power supply. However, the inductive element 36 held stored energy developed by current flowing through its windings. The energy stored in the inductive element 36 causes current to continue flowing around the closed circuit of the emitter to base electrodes of the transistor 44, the inductive element 36 and the diode 38. Thus, the transistor 44 is maintained in a conductive condition after the transistor 62 switches into a conductive condition.

The time required to dissipate the stored energy in the inductive element 36 is adjusted such that the transistor 44 will be maintained in a conductive condition for at least the length of a clock pulse. This prevents the transistor 44 from being switched into a non-conductive condition and developing a synchronized pulse during the clock pulse which activated the pulse synchronizer 20. This is important since otherwise a synchronized pulse would be initiated sometime during the clock pulse which energized the pulse synchronizer circuit and the input signal developed by the gate 18 (see FIG. 1) may or may not be stored by the shift register 16. Due to this unreliable operation, the delay circuit 35 is used to delay the synchronized pulse until after the energizing clock pulse terminates.

After the energy in the inductive element 36 is dissipated and current therein drops to zero, the transistor 44 is cut off and the output signal at the output circuit $E_o$ drops to a low potential level causing a synchronized pulse.

The capacitor 30 continues to discharge. However, before the capacitor 30 discharges so that the diode 34 is forward biased, another clock pulse occurs. Since the synchronized pulse is still present, the gate 18 develops an input pulse which is stored by the shift register 16. Also, since the pulse synchronizer 20 has already been energized and is in a synchronizing cycle, this clock pulse has no effect on its operation.

Subsequently, the capacitor 30 discharges to the point where the cathode electrode of the diode 34 drops below ground. This again causes current to flow through the transistor 44, the inductive element 36 to the —V power supply. The output signal $E_o$ then rises to a high potential level terminating the synchronized pulse. Subsequent clock pulses do not effect the operation of the bistable unit 22 while in a synchronizing cycle and the transistor 62 is in a conductive condition and the pulse at the input circuit $E_1$ continues.

For proper operation of the pulse synchronizer 20, the discharge time of capacitor 30 must be of the proper time duration. The discharge time of capacitor 30 to the point where diode 34 is forward biased must be at least as long as the time between the beginnings of two sequential clock pulses plus the time duration of one clock pulse and less than the time duration between the beginnings of three sequential clock pulses.

At the end of the pulse at the input circuit $E_1$, the signal applied to the anode of the diode 28 rises to a high potential level. This raises the potential at the cathode of the diode 54 to a high potential level and causes the transistor 62 to be switched into a non-conductive condition. When the transistor 62 switches into a non-conductive condition, its collector electrode drops to a low potential level. This negative change in potential at the collector of the transistor 62 is applied both to the capacitor 30 and the capacitor 70.

Referring to the capacitor 70, the negative change in potential is coupled therethrough to the base electrode of the transistor 72 causing it to immediately switch into a conductive condition, and its collector electrode to rise to a high potential level.

The drop in potential at the collector electrode of the transistor 62 is also applied to the capacitor 30. The capacitor 30 now starts to recharge back to its initial condition through the transistor 44, inductor 36, the diode 34 and the resistor 60.

After the capacitor 30 is recharged to its initial condition, the pulse synchronizer is again in a static state and ready to be energized into another synchronizing cycle at the simultaneous occurrence of a pulse at the input circuit $E_1$ and a clock pulse.

Figure 4:
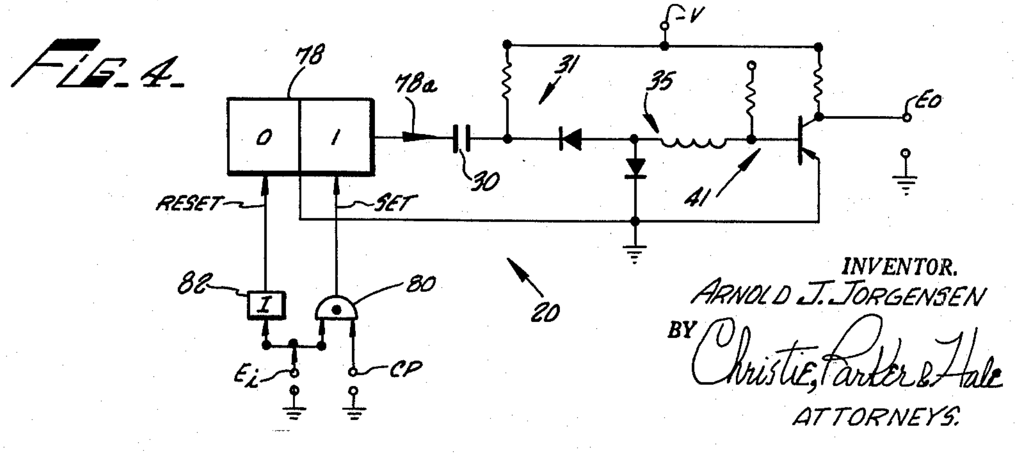
FIGURE 4 is a schematic diagram of an alternate pulse synchronizer circuit for use in the computer system of FIG. 1 and embodying the present invention.

FIGURE 4 shows an alternate pulse hynchronizer circuit embodying the present invention. The pulse synchronizer of FIG. 4 includes a conventional bistable circuit 78 which may be, for example, an Eccles-Jordan trigger circuit. The bistable circuit 78 will hereinafter be re-referred to as a flip-flop circuit. The flip-flop circuit 78 has two input circuits referred to as "set" and "reset" input circuits. A drop in potential at the set input circuit of the flip-flop 78 causes it to reliably trigger from a false state to a true state. Similarly, a drop in potential at the reset input circuit causes the flip-flop circuit 78 to reliably trigger from a true state to a false state. The only output of the flip-flop 78 used in FIG. 4 is that indicated by the symbol **78*a*. When the flip-flop 78 is in false and true states, the potential at the output circuit 78*a* is at low and high potentials, respectively. The set input circuit of the flip-flop circuit 78 is connected to the output circuit of an "and" gating circuit 80. The reset input circuit is connected to the output circuit of an inverter circuit 82**.

The "and" gating circuit 80 has two input circuits one of which is connected to the CP output circuit of the pulse generator 14 and the other being referenced by the symbol $E_1$. The inverter circuit 82 has a single input circuit connected to the $E_1$ input circuit.

The output circuit **78*a* is connected to the input circuit of the time delay circuit 31 at the capacitor 30. The time delay circuits 31 and 35 and the switching circuit 41** are connected and arranged identical to that shown and explained in FIG. 2. However, in FIG. 4 the bistable circuit 22 has been replaced with the flip-flop 78.

Assume that initially the flip-flop 78 is in a false state and a pulse is developed at the input circuit $E_i$. The following clock pulses causes the "and" gating circuit 80 to apply a negative pulse to the set input circuit of the flip-flop circuit 78. This causes the flip-flop circuit 78 to switch into a true state and the output circuit 78 rises from a low potential to a high potential level. This rise in potential is applied to the time delay circuit 31 identical to that descrbed in FIG. 2. After a short time delay due to the delay in the time delay circuit 35, a synchronized pulse is applied at the output circuit $E_o$.

Assume now that the signal at the input circuit $E_i$ rises from a low to a high potential level. This rise in potential is inverted by the inverter circuit 82 and applied as a drop in potential at the reset input circuit of the flip-flop circuit 78. The flip-flop circuit 78 then triggers back into a false state. The capacitor in the time delay circuit 31 then recharges for a subsequent synchronizing cycle.

It should be noted that there may be rearrangements and substitutions of components in the circuits disclosed as embodiments of the present invention and yet be within the scope of the following claims. For example, the time delay circuit 35 may be eliminated if the switching time of the transistor 44 is substantially equal to or longer than the width of a clock pulse. Also, other types of time delay circuits may be substituted for 31 and 35. In addition, the present invention is not limited to the use of transistors but vacuum tubes may be used instead.

What is claimed is:

1. A synchronizing circuit for synchronizing pulse signals with substantially evenly spaced recurring timing pulses of predetermined pulse width, comprising a bistable circuit having first and second states and normally arranged in said first state, a separate gating circuit connected to be responsive to the coincidence of a pulse signal to be synchronized and a timing pulse delivered thereto for forming an output signal, said bistable circuit being connected to be responsive to said output signal for switching into said second state, a switching circuit and a time delay circuit for controlling the switching circuit, said time delay circuit being responsive to the occurrence of the change in state of the bistable circuit and arranged with a time delay such that the switching circuit is switched to form a synchronized pulse beginning with the termination of the timing pulse causing the output signal from the gating circuit and ending during the time interval beginning with the termination of the next sequential timing pulse and ending with the beginning of the second timing pulse following the timing pulse causing the output signal from the timing circuit for thereby forming a synchronized pulse simultaneously with a single one of the timing pulses delivered to said gating circuit.

2. In a digital system including, a source of pulses to be synchronized, a source of clock pulses, a bistable circuit having first and second states and normally arranged in said first state, a separate gating circuit connected to be responsive to the coincidence of a pulse to be synchronized and a single clock pulse for developing a switching signal, said bistable circuit being connected to be responsive to said switching signal for switching into said second state, a switching circuit and a time delay circuit for controlling the switching circuit, said time delay circuit being responsive to the occurrence of the change in state of the bistable circuit and arranged with a time delay such that the switching circuit is switched to form a synchronized pulse beginning after the end of the clock pulse causing the output signal from the gating circuit and ending during the time interval beginning with the termination of the next sequential clock pulse and ending with the beginning of the second clock pulse following the clock pulse causing the output signal from the gating circuit for thereby forming a synchronized pulse simultaneously with a single one of the clock pulses.

3. An electrical circuit for forming a unique signal synchronized with a single clock pulse for each different occurrence of a signal to be synchronized with a clock pulse comprising: a bistable circuit including gating means for causing a predetermined change in state of the bistable circuit in response to the application of a clock pulse in coincidence with a signal to be synchronized, a controllable switching circuit and a time delay circuit having a time delay and arranged to be responsive to said bistable circuit change in state for switching the switching circuit thereby causing a unique output signal commencing following the termination of the coincidentally occurring clock pulse and terminating only following the termination of the first sequential clock pulse following the coincidentally occurring clock pulse but prior to the beginning of the second sequential clock pulse for causing a unique output signal to be formed simultaneously with only such first sequential clock pulse.

4. An electrical circuit for forming a unique signal synchronized with a single clock pulse for each different occurrence of a signal to be synchronized with a clock pulse comprising: a bistable circuit including gating means for causing a predetermined change in state of the bistable circuit in response to the application of a clock pulse in coincidence with a signal to be synchronized, a first time delay circuit arranged to be responsive to said change in state of the bistable circuit for forming a time delay signal having a time duration at least as long as that between the beginnings of two sequential clock pulses plus the time duration of one clock pulse and less that between the beginnings of three sequential clock pulses, and means responsive to the time delay signal for forming a synchronized signal during substantially the duration thereof including a second time delay circuit for delaying the formation of the synchronized signal until at least the termination of the coincidentally occurring clock pulse.

5. An electrical circuit for forming a unique signal synchronized with a single clock pulse for each different occurrence of a signal to be synchronized with a clock pulse comprising: first and second controllable switching circuits each having first and second states and arranged whereby the second switching circuit is responsive to the change into a particular state of the first switching circuit for switching into the opposite state, a gating circuit for controlling the state of the first switching circuit and arranged to be responsive to the coincidence of the application of a clock pulse and a signal to be synchronized for switching said first switching circuit into the first state thereof and arranged in response to the second state of the second switching circuit for maintaining the first switching circuit in the first state thereof during the time interval the signal to be synchronized is applied thereto, a first time delay circuit arranged to be responsive to the change into the second state of said second switching circuit for immediately forming a time delay signal having a time duration at least as long as that between the beginnings of two sequential clock pulses plus the time duration of one clock pulse and having a time duration less than that between the beginnings of three sequential clock pulses, and means responsive to the time delay signal for forming a synchronized signal during the time delay signal including a second time delay circuit arranged for delaying the formation of the synchronized signal until after the termination of the coincidentally occurring clock pulse and thereby cause the synchronized signal to occur simultaneously with only the first clock pulse following the coincidentally occurring clock pulse.

6. An electrical circuit as defined in claim 5 wherein said synchronized signal forming means comprises a third controllable switching circuit for forming the synchronized signal in response to a control signal applied thereto, and a time delay circuit serially coupled between the first time delay circuit and the third switching circuit and arranged for applying a control signal to the third switching circuit during the time delay signal and arranged with an internal delay of sufficient time duration to inhibit the formation of the control signal until after the termination of the coincidentally occurring clock pulse.

7. An electrical circuit as defined in claim 5 wherein said synchronized pulse forming means comprises a third transistor switching circuit normally arranged in a first conductive condition including a control circuit and an output circuit for forming the unique signal during a second conductive condition thereof, and a second time delay circuit including an inductive impedance element arranged to be responsive to the time delay signal for switching the third switching circuit into the second conductive condition thereof and causing it to form the unique signal, said inductive impedance element being serially coupled and arranged between the first time delay circuit and the third switching circuit for maintaining the first conductive condition of the third switching circuit existing prior to the delay signal until the termination of the coincidentally occurring clock pulse and thereby causing the unique signal to be formed simultaneously with only the first clock pulse following the coincidentally occurring clock pulse.

8. An electrical circuit for forming a unique signal synchronized with a single clock pulse for each different occurrence of a signal to be synchronized with a clock pulse comprising: first and second controllable switching circuits each having first and second states and arranged whereby the second switching circuit is responsive to the change into a particular state of the first switching circuit for switching into the opposite state, a gating circuit for controlling the state of the first switching circuit and arranged to be responsive to the coincidence of the application of a clock pulse and a signal to be synchronized for switching said first switching circuit into the first state thereof and arranged in response to the second state of the second switching circuit for maintaining the first switching circuit in the first state thereof during the time interval the signal to be synchronized is applied thereto, a controllable switching circuit and a time delay circuit having a time delay and arranged to be responsive to the change of state into the first state of said first switching circuit for switching the switching circuit and thereby causing a unique output signal commencing following the termination of the coincidentally occurring clock pulse and terminating only following the termination of the first sequential clock pulse following the coincidentally occurring clock pulse but prior to the beginning of the second sequenential clock pulse for causing a unique output signal to be formed simultaneously with only such first sequential clock pulse.

9. An electrical circuit for forming a unique signal synchronized with a single clock pulse for each different occurrence of a signal to be synchronized with a clock pulse comprising: a bistable circuit including gating means for causing a predetermined change in state of the bistable circuit in response to the application of a clock pulse in coincidence with a signal to be synchronized, a first time delay circuit arranged to be responsive to the change in state of the bistable circuit for forming a time delay signal commencing substantially at the beginning of the coincidentally occurring clock pulse and ending during the time interval beginning with the end of the first sequential clock pulse and ending with the beginning of the second sequential clock pulse following the coincidentally occurring clock pulse, a controllable switching circuit, and a second time delay circuit serially coupled between the first time delay circuit and the switching circuit and arranged to be responsive to the time delay signal for switching the switching circuit and thereby causing same to form a unique signal during substantially the duration of the delay signal, the second time delay signal being arranged with an internal delay sufficient for delaying the formation of the unique signal until after the termination of the coincidentally occurring clock pulse and thereby cause a unique signal to be formed during only the second clock pulse following the coincidentally occurring clock pulse.

References Cited by the Examiner

UNITED STATES PATENTS

| | | | |
|---|---|---|---|
| 2,760,087 | 8/56 | Felker | 207—88.5 |
| 2,900,533 | 8/59 | Howes | 307—88.5 |
| 2,903,606 | 9/59 | Curtis | 307—88.5 |
| 2,906,892 | 9/59 | Jones | 307—88.5 |
| 2,950,461 | 8/60 | Tryon | 307—88.5 |
| 2,956,181 | 10/60 | Norman | 307—88.5 |

ARTHUR GAUSS, *Primary Examiner.*

GEORGE N. WESTBY, *Examiner.*

UNITED STATES PATENT OFFICE

CERTIFICATE OF CORRECTION

Patent No. 3,188,484

June 8, 1965

Arnold J. Jorgensen

It is hereby certified that error appears in the above numbered patent requiring correction and that the said Letters Patent should read as corrected below.

Figure 3:
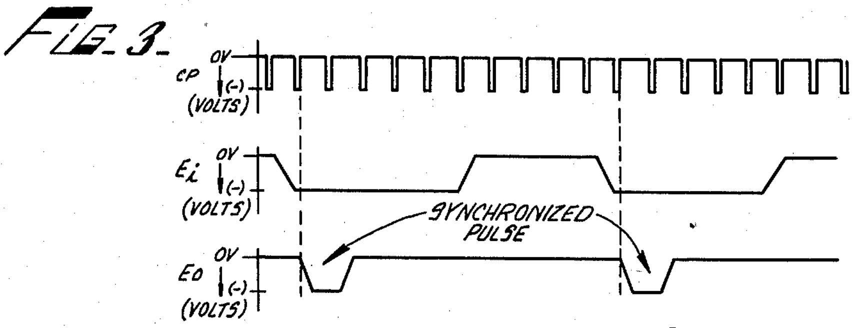
FIGURE 3 is a timing diagram showing the signals into and out of the pulse synchronizer circuit of FIG. 2.

Column 2, line 32, after "20" insert -- into --; column 4, line 10, for "FIG. 2" read -- FIG. 3 --; column 6, line 48, for "hynchronizer" read -- synchronizer --.

Signed and sealed this 23rd day of November 1965.

(SEAL)
Attest:

ERNEST W. SWIDER
Attesting Officer

EDWARD J. BRENNER
Commissioner of Patents